United States Patent [19]

Hasegawa

[11] Patent Number: 5,010,397
[45] Date of Patent: Apr. 23, 1991

[54] TRIPLE TUBE TYPE PROJECTION TELEVISION

[75] Inventor: Shinichi Hasegawa, Tokyo, Japan

[73] Assignee: Pioneer Electronic Corporation, Tokyo, Japan

[21] Appl. No.: 374,699

[22] Filed: Jul. 3, 1989

[30] Foreign Application Priority Data

Oct. 26, 1988 [JP] Japan ................................ 63-268308

[51] Int. Cl.[5] ............................................. H04N 9/31
[52] U.S. Cl. ......................................... 358/60; 358/64; 358/231; 358/237
[58] Field of Search .................... 358/60, 64, 63, 61, 358/62, 231, 237

[56] References Cited

U.S. PATENT DOCUMENTS

| | | | |
|---|---|---|---|
| 4,274,110 | 6/1981 | Lehnert | 358/60 |
| 4,352,124 | 9/1982 | Kline | 358/60 |
| 4,376,949 | 3/1983 | Rowe | 358/60 |
| 4,730,211 | 3/1988 | Hasegawa | 358/60 |

FOREIGN PATENT DOCUMENTS 0050690 2/1989 Japan .

Primary Examiner—Howard W. Britton
Assistant Examiner—Michael H. Lee
Attorney, Agent, or Firm—Finnegan, Henderson, Farabow, Garrett, and Dunner

[57] ABSTRACT

A triple tube type projection television projects images of blue, green and red projecting tubes onto a screen by lenses disposed in front of the respective projecting tubes, and synthesizes the images by the three projecting tubes on the screen to provide a color image. The projection television comprises a device for offsetting intersection points between the screen and the optical axes of lenses on both sides of a central lens outside from the intersection point between the screen and the optical axis of the central lens; and a device for dislocating the centers of the projecting tubes on both sides outside from the optical axes of the lenses thereof.

4 Claims, 2 Drawing Sheets

TRIPLE TUBE TYPE PROJECTION TELEVISION

BACKGROUND OF THE INVENTION

The present invention relates to a triple tube type projection television for producing a color image by converging blue, green and red images formed by respective projecting tubes using lenses and conforming these images onto a screen.

FIG. 1 shows an optical system of a conventional projection television of this kind. In this figure, a projecting tube 10G for projecting a green image (hereinafter "a green projection tube") is disposed in the center, and projecting tubes 10R and 10B for projecting red and blue images, respectively. (hereafter "red projecting tube" and "green projecting tube") are arranged in series on the left and right sides of green projecting tube 10G. In the construction of lenses group 20, lenses 20G, 20R and 20B are respectively arranged in front of green, red and blue projecting tubes 10G, 10R and 10B. Image light beams of green, red and blue projecting tubes 10G, 10R and 10B are converged by lenses 20G 20R and 20B and are focused onto screen 30. thereby producing a color image.

In the case above, central lens 20G is arranged such that optical axis 20Gs of lens 20G is perpendicular to screen 30 so that there is no problem with respect to this arrangement. However, left and right lenses 20R and 20B are arranged such that their optical axes 20Rs and 20Bs, respectively, are inclined with respect to screen 30. Therefore, as shown in FIG. 2, in accordance with the so-called Sheinpulf's law, tube faces (image faces) 10Ra, 10Ba of projecting tubes 10R, 10B, respectively, are inclined by angle $\alpha$ with respect to lens faces of lenses 20R, 20B, respectively, so as to focus the images on the entire screen 30 even when the above optical axes are inclined with respect to this screen. Inclination angle $\alpha$ between the lens face and the tube face is provided by the following formula when the magnification of lenses 20 is m and the angle formed between the lens face of lenses 20 and screen 30 is $\theta$.

$$(1/m)\tan\theta = \tan\alpha$$

When the optical axes of lenses 20R, 20B on both sides of central lens 20G are set to be in conformity with the optical axis of central lens 20G on screen 30 as mentioned above, as shown in FIG. 1 left and right view angles $\beta_1$, $\beta_2$ of respective lenses 20R, 20B with respect to optical axes 20Rs, 20Bs thereof are different from each other so that the brightness of the red and blue colors are different from each other on screen 30 on the right and left sides thereof by the law of the fourth power of cosine of lens. Further, since the differences in brightness are reverse to each other on the left and right sides of the screen with respect to the red and blue colors, the color balance on screen 30 becomes so bad that an irregular color is caused.

Accordingly, another projection television as shown in FIG. 3 has been proposed internally by the assignee of the invention herein. In this projection television, the optical axes of the lenses on both sides of the central lens are respectively offset from the center of the screen so that left and right view angles $\beta_1$, $\beta_2$ with respect to respective optical axes 20Rs, 20Bs are approximately equal to each other.

In this projection television in FIG. 3, similar to the conventional projection television of this kind, optical axes 20Rs, 20Bs of lenses 20R, 20B are in conformity with the centers of tube faces 60R, 60B of projecting tubes. A so-called keystone correction for distorting images 70R, 70B produced on the projecting tubes in the shape of a trapezoid is performed to correct the difference in magnification between the left and right lenses on the basis of the above-mentioned Sheinpulf's law.

Image centers 80R, 80B are shifted from the centers of tube faces 60R, 60B in the respective projecting tubes such that centers (intersection points of diagonal lines of the trapezoids) 80R, 80B of picture images 70R, 70B are directed to the center of screen 30 in a state in which the optical axes of the lenses and the centers of the projecting tubes are in conformity with each other as mentioned above.

However, in such a projection television, the image centers are shifted from the centers of the tube faces by applying an external magnetic field applied to electrodes of the projecting tubes by centering magnets disposed in neck portions of the projecting tubes. This applies a biasing force to scanning electrons. When this biasing force is excessively applied to the scanning electrons, the image is disturbed in the moving direction thereof, thereby causing a halo phenomenon to occur.

SUMMARY OF THE INVENTION

To overcome the above-mentioned problems, an object of the present invention is to provide a triple tube type projection television for improving the color balance by offsetting the optical axes of lenses on both sides of a central lens and providing a preferable image without causing a halo effect.

With the above object in mind, the present invention resides in a triple tube type projection television for projecting images of blue, green and red projecting tubes onto a screen by lenses disposed in front of the respective projecting tubes, and synthesizing the images of said three projecting tubes on the screen to provide a color image. The projection television comprises means for offsetting intersection points between the screen and the optical axes of lenses on both sides of a central lens from the intersection point between the screen and the optical axis of the central lens; and means for dislocating the centers of the projecting tubes on said both sides from the optical axes of the lens thereof. In accordance with this construction of the present invention, the image centers are approximately set to be the centers of the projecting tubes so that an external magnetic field applied to electron guns is reduced.

BRIEF DESCRIPTION OF THE DRAWINGS

The present invention will be more apparent from the following description of the preferred embodiments thereof in conjunction with the accompanying drawings in which.

DESCRIPTION OF THE PREFERRED EMBODIMENTS

Figure 4:
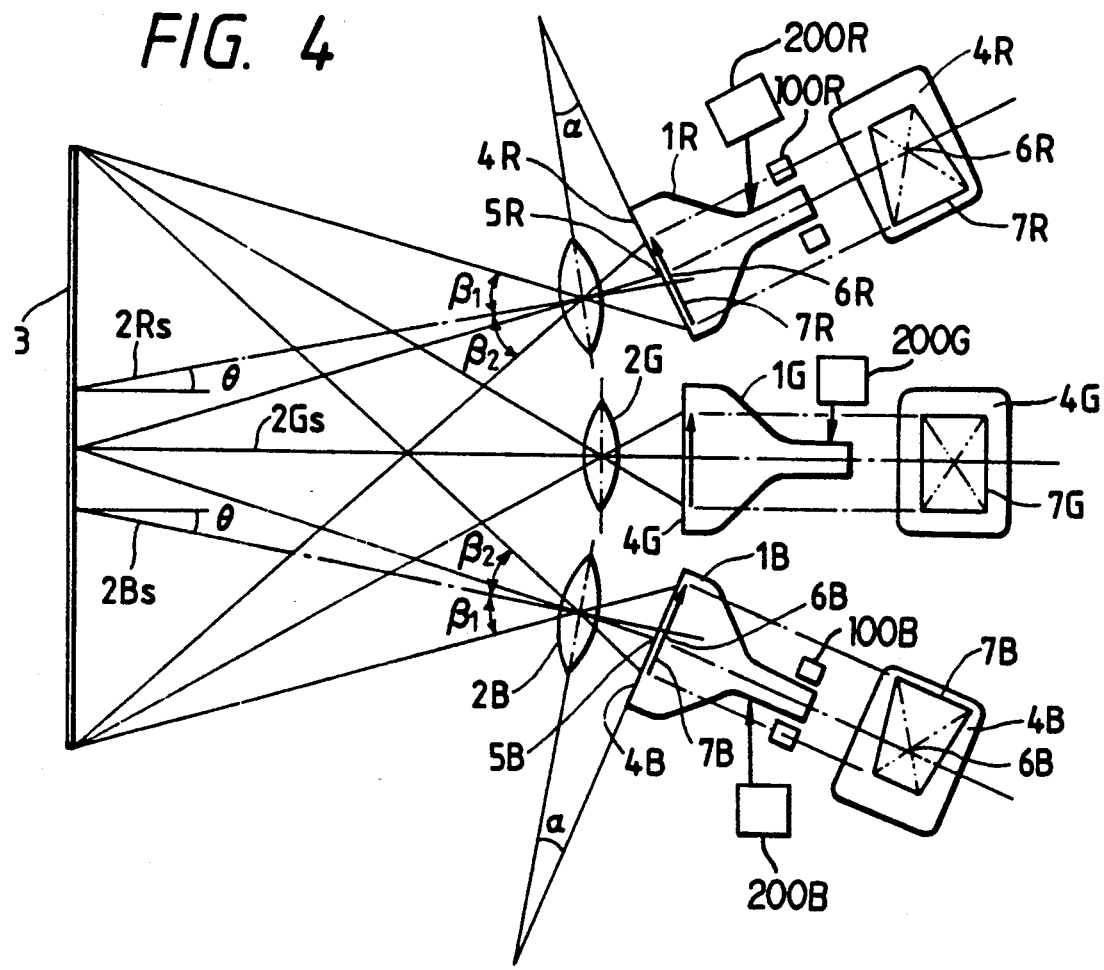
FIG. 4 is a view showing an optical system of a triple tube type projection television according to an embodiment of the present invention.

The preferred embodiment of a triple tube type projection television in accordance with the present invention will now be described in detail with reference to FIG. 4, wherein the angles, etc. are set to be large to clarify the construction of the projection television.

Projecting tube 1 is constructed by green, red and blue projecting tubes 1G, 1R and 1B respectively having flat tube faces 4G, 4R and 4B. Light beams of picture images are converged by lenses 2G, 2R and 2B and are focused on screen 3 through unillustrated mirrors, thereby synthesizing a color picture image.

Optical axis 2Gs of lens 2G disposed in front of green projecting tube 1G is perpendicular to screen 3 and image 7G of green projecting tube 1G is centered on tube face 4G.

Optical axes 2Rs, 2Bs of lenses 2R, 2B, respectively, disposed in front of red and blue projecting tubes 1R, 1B, are offset to intersect screen 3 at positions offset from the intersection point between screen 3 and optical axis 2Gs of central lens 2G. With respect to this offset amount, the distances between the center and the left and right intersection points are respectively set to about 20 mm when the distance from central lens 2G to screen 3 is 1260 mm, for example.

In accordance with this construction left and right view angles $\beta_1$, $\beta_2$ of optical axes 2Rs, 2Bs are approximately equal to each other so that the color balance on screen 3 becomes preferable.

Inclination angles $\alpha$ between lenses 2R, 2B and respective tube faces 4R, 4B of red and blue projecting tubes 1R, 1B are set to be predetermined values in accordance with the above-mentioned Sheinpulf's law by inclination angles 8 between respective optical axes 2Rs, 2Bs and screen 3 and magnifications of lenses 2R, 2B.

Projecting tubes 1R, 1B are arranged mechanically such that centers 5R, 5B of respective tube faces 4R, 4B are dislocated outside from optical axes 2Rs, 2Bs of respective lenses 2R, 2B. Images 7R, 7B are projected such that the image centers (intersection points of diagonal lines of trapezoids) 6R, 6B are located in positions of centers 5R, 5B of the tube faces dislocated outside from these optical axes 2Rs, 2Bs. This construction, in which image centers 6R, 6B are set to centers 5R, 5B of the tube faces of projecting tubes 1R, 1B, is provided as a state in which no external magnetic field is applied to electron guns of the projecting tubes.

Figure 1:
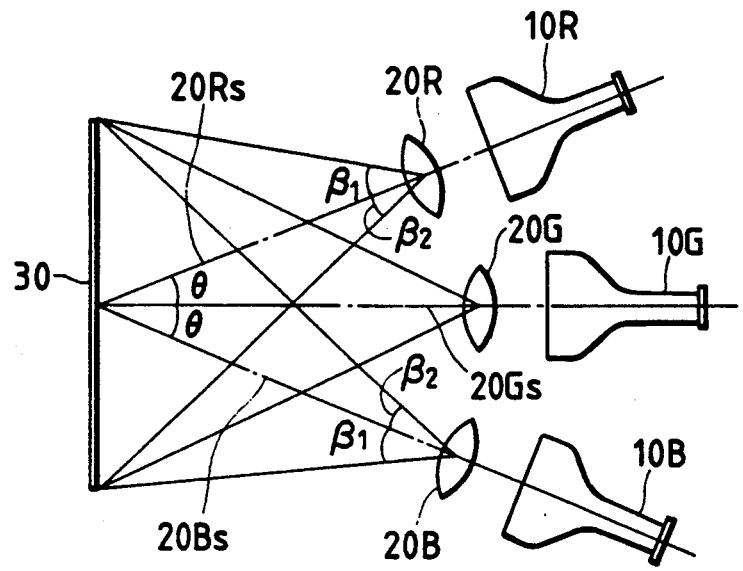
FIG. 1 is a view showing the basic construction of a conventional triple tube type projection television.
Figure 2:
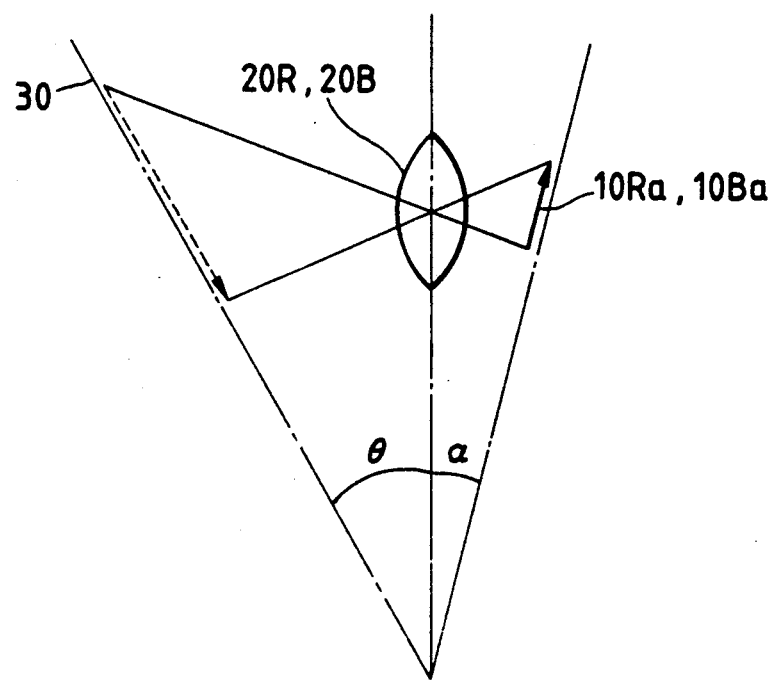
FIG. 2 is a view for explaining Sheinpulf's law.
Figure 3:
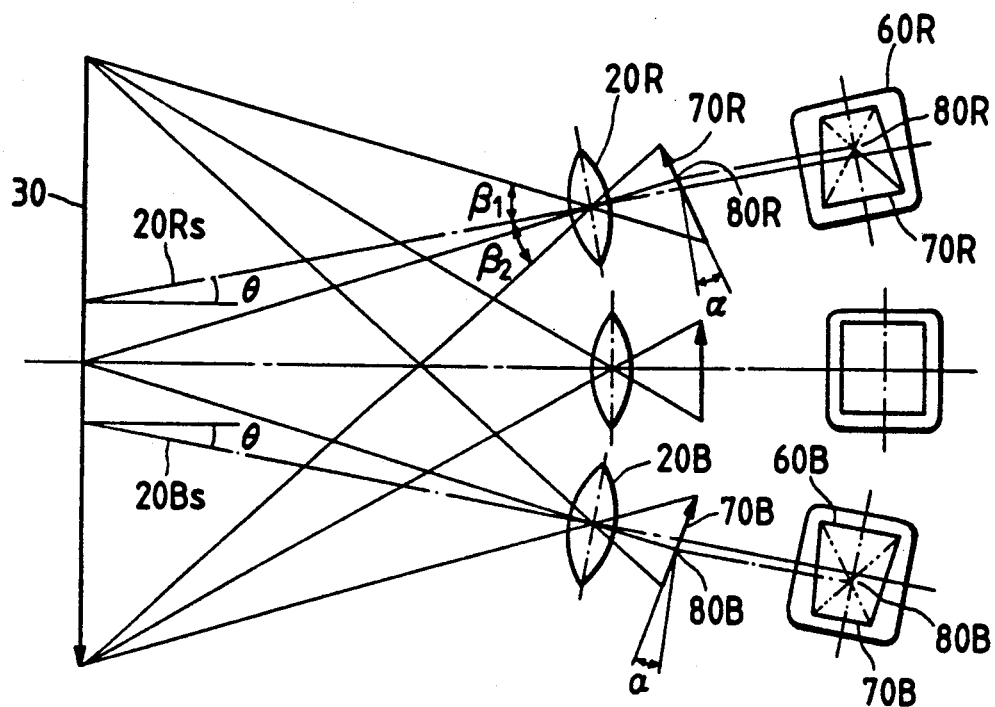
FIG. 3 is a view showing another example of a projection television.

Accordingly, the center of each outside projecting tube is made to be mechanically offset from the optical axis of its respective lens 2R, 2B. The center of the image can thereby remain in the center of the screen and still be offset from the optical axis without the need for applying a substantial external field as in FIG. 3. As a practical matter, however, means 100R and 100B may be provided in order to apply a slight external magnetic field may be because of the difficulty in providing perfect adjustment of the images using only mechanical adjustment of the projecting tubes and lenses.

For example the outer configuration of a projecting tube may be irregular, thereby reducing the accuracy in properly positioning the tubes. Also, the tubes are coupled to a cooling device 200R, 200G, and 200B which causes vibration, making it difficult to cause the images to perfectly coincide on the screen. Additionally, certain mechanical limitations in the equipment may make it impossible to provide the full offset needed for precise positioning. Therefore, as noted above, a slight external field will be used to adjust the positioning of the tube images, though the field will be low enough to avoid causing the halo effect.

As mentioned above, in accordance with the present invention, with respect to the projecting tubes on both sides of the triple tube type projection television, the intersection points between the optical axes of the lenses on both sides and the screen are offset outside from the intersection point between the optical axis of the central lens and the screen. Further, the centers of the projecting tubes are dislocated outside from the optical axes of the lenses. Thus, the external magnetic field applied to the electron guns is reduced with the image centers as centers of the projecting tubes. Therefore, the color balance is improved and a preferable image without halo can be provided.

What is claimed is:

1. A triple tube type projection television for projecting images from blue, green and red projecting tubes onto a screen by lenses disposed in front of the respective projecting tubes and synthesizing the images from said three projecting tubes on the screen to provide a color image, wherein:
   intersection points between the screen and respective ones of the optical axes of lenses on both sides of a central lens are offset outwardly from the intersection point between the screen and the optical axis of the central lens;
   tube centers of the projecting tubes on said both sides are dislocated outwardly from the optical axes of the lenses therefor;
   said triple tube type projection television comprising:
   cooling means coupled to said projecting tubes in order to proved adequate cooling thereof; and
   means for applying an external magnetic field to said projecting tubes in order to supplementally adjust the images on the screen.

2. A projection type TV comprising:
   a screen;
   first, second, and third projecting tubes for projecting three respective different color images on said screen to form a color TV image, each of said projecting tubes having a face;
   three lenses intermediate said three projecting tubes and said screen and associated respectively with said three projecting tubes for conforming said images onto said screen, each of said lenses having an optical axis;
   said first of said projecting tubes having an associated lens positioned to cause the optical axis of said lens to intersect said screen at a central point;
   each of said second and third of said projecting tubes having associated lenses being positioned as outside projecting tubes and lenses as follows:
   said outside lens positioned to cause its optical axis to intersect said screen offset form said central point;
   said outside projecting tube positioned at an angle with respect to its associated lens; and
   said outside projecting tube having its respective center offset from the point of intersection of the axis of said associated lens and the respective projecting tube faces;
   said projection type TV further comprising:
   cooling means coupled to said projecting tubes in order to provide adequate cooling thereof; and means for applying an external magnetic field to said projecting tubes in order to supplementally adjust the images on the screen.

3. A projection type TV as claimed in claim 2 wherein an angle $\theta$ formed between the optical axis of the lens associated with said first projecting tube and the optical axis of the lens associated with either of said second or third projecting tubes, and an angle $\alpha$ formed between a plane parallel to the face of an outside projecting tube and a plane perpendicular to the optical axis of its associated lens, substantially satisfy the following relationship:

$$\left(\frac{1}{m}\right)\tan\theta = \tan\alpha;$$

where m is the magnification of said outside lens.

4. A projection type TV as claimed in claim 3 wherein said first projecting tube projects a green image and said second and third projecting tubes project red and blue images respectively.

* * * * *

UNITED STATES PATENT AND TRADEMARK OFFICE
CERTIFICATE OF CORRECTION

PATENT NO.   :   5,010,397
DATED        :   April 23, 1991
INVENTOR(S)  :   Shinichi Hasegawa It is certified that error appears in the above-identified patent and that said Letters Patent is hereby corrected as shown below:

Claim 1, Column 4, Line 36, change "proved" to --provide--; and

Claim 2, Column 4, Line 58, change "form" to --from--.

Signed and Sealed this

Twenty-ninth Day of December, 1992

Attest:

DOUGLAS B. COMER

*Attesting Officer*   *Acting Commissioner of Patents and Trademarks*